(12) United States Patent
Wargo

(10) Patent No.: US 10,500,613 B2
(45) Date of Patent: Dec. 10, 2019

(54) INDUCTION CONVEYOR

(71) Applicant: Laitram, L.L.C., Harahan, LA (US)

(72) Inventor: Stephen G. Wargo, Laurel, MD (US)

(73) Assignee: Laitram, L.L.C., Harahan, Los Angeles, CA (US)

( * ) Notice: Subject to any disclaimer, the term of this patent is extended or adjusted under 35 U.S.C. 154(b) by 0 days.

(21) Appl. No.: 16/356,048

(22) Filed: Mar. 18, 2019

(65) Prior Publication Data

US 2019/0210069 A1 Jul. 11, 2019

Related U.S. Application Data

(63) Continuation of application No. 15/727,730, filed on Oct. 9, 2017, now Pat. No. 10,232,410, which is a
(Continued)

(51) Int. Cl.
| | | |
|---|---|---|
| *B07C 7/00* | (2006.01) | |
| *B65G 43/10* | (2006.01) | |
| *B65G 47/30* | (2006.01) | |
| *B65G 17/24* | (2006.01) | |
| *B65G 47/69* | (2006.01) | |

(Continued)

(52) U.S. Cl.
CPC .............. *B07C 7/00* (2013.01); *B65G 17/24* (2013.01); *B65G 43/10* (2013.01); *B65G 47/082* (2013.01); *B65G 47/1492* (2013.01); *B65G 47/261* (2013.01); *B65G 47/30* (2013.01);
(Continued)

(58) Field of Classification Search
CPC ........ B65G 37/00; B65G 43/10; B65G 59/00; B65G 47/261; B65G 47/085; B65G 47/26; B65G 47/28; B65G 47/30; B65G 47/31; B65G 17/24; B07C 7/00

See application file for complete search history.

(56) References Cited

U.S. PATENT DOCUMENTS

| | | | |
|---|---|---|---|
| 3,485,339 A | 12/1969 | Miller et al. | |
| 5,285,887 A * | 2/1994 | Hall ...................... | B65G 43/10 198/460.1 |

(Continued)

FOREIGN PATENT DOCUMENTS

| | | |
|---|---|---|
| EP | 1123882 A1 | 8/2001 |
| EP | 2456693 A1 | 5/2012 |

(Continued)

OTHER PUBLICATIONS

Automatic Parcel Singulator brochure, date retrieved Nov. 26, 2014, Crisplant a/s, Beumer Group, Aarhus N, Denmark.
(Continued)

*Primary Examiner* — Mark A Deuble
(74) *Attorney, Agent, or Firm* — Catherine M. Bishop

(57) ABSTRACT

An article induction system for preparing a stream of articles, such as mail parcels, for processing employs a series of conveyors operating under control of a controller for feeding articles to an operator at a cull belt at an optimal paced rate. The article induction system includes a destacking section, a separation and alignment section, a buffer section and a culling section manned by an operator. A controller controls the speed of each component based on measurements provided by sensors so as to feed articles to the operator at a desired paced rate.

19 Claims, 13 Drawing Sheets

Related U.S. Application Data continuation of application No. 14/604,847, filed on Jan. 26, 2015, now Pat. No. 9,815,090.

(60) Provisional application No. 61/931,961, filed on Jan. 27, 2014.

(51) Int. Cl.
| | |
|---|---|
| *B65G 47/14* | (2006.01) |
| *B65G 47/68* | (2006.01) |
| *B65G 47/08* | (2006.01) |
| *B65G 47/26* | (2006.01) |

(52) U.S. Cl.
CPC ........... *B65G 47/682* (2013.01); *B65G 47/69* (2013.01); *B65G 2201/0285* (2013.01); *B65G 2203/044* (2013.01)

(56) References Cited

U.S. PATENT DOCUMENTS

| | | | | |
|---|---|---|---|---|
| 5,400,896 A | * | 3/1995 | Loomer | B65G 47/71 |
| | | | | 198/415 |
| 5,582,286 A | * | 12/1996 | Kalm | B65G 47/261 |
| | | | | 198/781.06 |
| 5,638,938 A | | 6/1997 | Lazzarotti et al. | |
| 6,401,936 B1 | * | 6/2002 | Isaacs | B65G 43/08 |
| | | | | 198/367.1 |
| 6,471,044 B1 | | 10/2002 | Isaacs et al. | |
| 6,714,836 B2 | | 5/2004 | Neary et al. | |
| 7,007,792 B1 | * | 3/2006 | Burch | B65G 17/24 |
| | | | | 198/370.03 |
| 8,025,142 B2 | | 9/2011 | Alexander et al. | |
| 8,763,788 B2 | * | 7/2014 | Neiser | B65G 47/268 |
| | | | | 198/617 |
| 9,815,090 B2 | * | 11/2017 | Wargo | B07C 7/00 |
| 10,232,410 B2 | * | 3/2019 | Wargo | B07C 7/00 |
| 2003/0192775 A1 | * | 10/2003 | Ehlert | B65G 13/073 |
| | | | | 198/781.04 |
| 2007/0261941 A1 | * | 11/2007 | Pelak | B65G 47/261 |
| | | | | 198/781.05 |
| 2010/0101919 A1 | | 4/2010 | Itoh et al. | |
| 2011/0022221 A1 | * | 1/2011 | Fourney | B65G 17/24 |
| | | | | 700/230 |
| 2012/0024669 A1 | * | 2/2012 | Danelski | B65G 43/10 |
| | | | | 198/617 |
| 2014/0339048 A1 | | 11/2014 | Wooldridge et al. | |

FOREIGN PATENT DOCUMENTS

| | | |
|---|---|---|
| FR | 2576528 A1 | 8/1986 |
| JP | 04-246016 | 2/1992 |
| JP | 2007-153484 A | 6/2007 |
| WO | 00-66280 A2 | 11/2000 |
| WO | 01-74693 A1 | 10/2001 |
| WO | 2011011195 A1 | 1/2011 |
| WO | 2012101576 A2 | 8/2012 |

OTHER PUBLICATIONS

International Search Report and Written Opinion of the International Searching Authority, PCT/US2015/012823, dated May 8, 2015, Korean Intellectual Property Office, Republic of Korea.

Extended European Search Report of EP15741023.4, dated Jul. 24, 2017, European Patent Office, Munich, Germany.

Communication/Office Action for European patent application No. 15741023.4 dated 23, 2018, European Patent Office, NL.

Notice of Rejection/Office Action for Japanese patent application No. 2016-548009; dated Dec. 4, 2018, Japan Patent Office.

Office Communication of EP Application No. 15741023.4 dated Jul. 15, 2019, European Patent Office, Netherlands.

* cited by examiner

INDUCTION CONVEYOR

RELATED APPLICATIONS

The present application is a continuation application of U.S. patent application Ser. No. 15/727,730, filed Oct. 9, 2017 and entitled "Induction Conveyor, which is a continuation application of U.S. patent application Ser. No. 14/604,847, filed Jan. 26, 2015, now U.S. Pat. No. 9,815,090, and entitled "Induction Conveyor, which in turn claims priority to U.S. Provisional Patent Application No. 61/931,961, filed Jan. 27, 2014, entitled "Induction Conveyor", the contents of which are herein incorporated by reference.

FIELD OF THE INVENTION

The present invention relates to the field of power-driven conveyors. More particularly, the present invention relates to an induction conveyor that prepares conveyed articles for sorting using a sorter or for another process.

BACKGROUND OF THE INVENTION

In mail processing systems and other applications involving processing of articles, it is often necessary to singulate articles into a single file stream, properly orient the articles, and space the articles prior to sorting the articles using an automated sorter. There are two current approaches to converting a bulk flow of articles, such as parcels, onto a conveyor sortation system for sorting or otherwise processing: manual induction and automatic induction.

Manual induction requires a worker to manually select, orient, and place an individual parcel on a conveyor. The parcel can be placed directly on the sorter or on a variety of different types of inductions which transition the parcel onto the sorter.

Automatic induction uses automation to automatically convert bulk flow of parcels into a single file stream to feed a sorter without an operator. If the stream is not appropriate for sortation, mechanical or electrical devices are used to reject, recirculate, or remove the inappropriate articles from the flow. Inappropriate flow for sortation may contain doubles, inadequate gapping, and non-conveyable items. Bulk flows of residential mail traditionally contain a high percentage of bags, soft goods, and envelopes that do not perform well on current automation

SUMMARY OF THE INVENTION

A system and method for preparing a stream of articles, such as mail parcels, for processing employs a buffer for feeding articles to an operator at an optimal paced rate. The article induction system includes a destacking section, a separation and alignment section, a buffer section and a culling section manned by an operator. A controller controls the speed of each component based on measurements provided by sensors so as to feed articles to the operator at a desired paced rate.

According to one aspect, an induction conveyor system for preparing a product for processing, comprises a plurality of upstream conveyors for converting a bulk flow of products into a series of products, a buffer conveyor for receiving the series of products, buffering the series of products and releasing the product to a cull belt, a cull belt for conveying product from the buffer past an operator at a selected paced rate and a controller for modulating conditions in the induction conveyor system to keep the buffer conveyor at least substantially full of product, based on measurements of the product by a plurality of sensors. The buffer conveyor comprises a plurality of roller zones, each roller zone comprising a plurality of rollers controlled together and including a powered roller and a zone sensor for sensing product in the roller zone.

According to another aspect, an induction conveyor system for preparing a product for processing, comprises a plurality of upstream conveyors for converting a bulk flow of products into a series of products, a buffer conveyor for receiving the series of products, buffering the series of products and releasing the product to a cull belt, a buffer empty sensor for sensing that the buffer conveyor is low of product, a cull belt for conveying product from the buffer past an operator at a selected paced rate and a controller for modulating conditions in the system to keep the buffer conveyor at least substantially full of product, based on measurements of the product by a plurality of sensors, wherein the controller increases a speed of an upstream conveyor to fill the buffer conveyor with product.

According to another aspect, an induction conveyor system for preparing a product for processing, comprises a plurality of upstream conveyors for converting a bulk flow of products into a series of products, a buffer conveyor for receiving the series of products, buffering the series of products and releasing the product to a cull belt, a buffer full sensor for sensing that the buffer conveyor is full of product, a cull belt for conveying product from the buffer past an operator at a selected paced rate and a controller for modulating conditions in the system based on measurements of the product by a plurality of sensors, wherein the controller decreases a speed of an upstream conveyor to reduce a flow of product to the buffer conveyor.

DETAILED DESCRIPTION

A hybrid approach to preparing articles, such as parcels, for processing, uses an article induction system that comprises a combination of automated technology and an operator to prepare the articles. The article induction system includes a buffer for regulating the articles prior to releasing the articles to an operator at a selected paced rate. The approach is especially beneficial when processing bulk flows of residential mail, which traditionally contains a high percentage of bags, soft goods, and envelopes that do not perform well on current automation. The current system and method provides higher productivity relative to the prior manual methods of induction. The invention will be described below relative to certain illustrative embodiments, though those skilled in the art will recognize that the invention is not limited to the illustrative embodiments.

Figure 1:
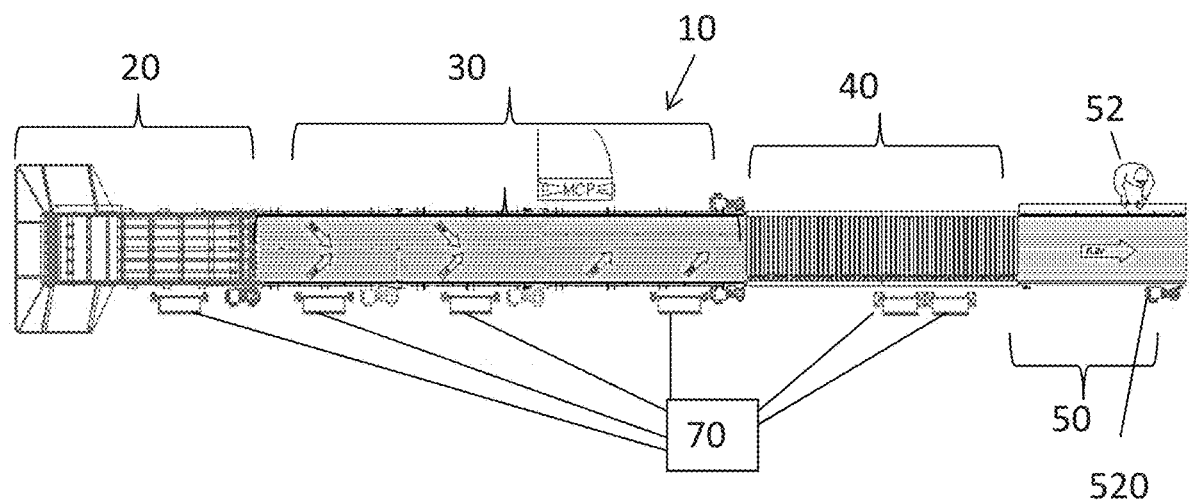
FIG. 1 is an overhead view of an article induction system of an illustrative embodiment of the invention.

FIG. 1 is an overhead schematic view of a product induction system 10 of an illustrative embodiment of the invention. The illustrative system 10 includes a first section 20 for depositing articles onto the induction system, a separator 30 in a second section, a buffer in a third section 40, and a culler manned by an operator 52 in a fourth section 50.

The product induction system includes a control system 70 for controlling the different components. The illustrative control system controls the speed of each component so as to feed articles to the operator 52 at a desired paced rate. Each component may operate at a standard speed, for example, delivering between about 3,000 and about 5,000 parcels per hour to the operator, or another paced rate, and the speed may adjust depending on certain conditions. The separator 30 singulates product and feeds the product to the buffer 40, while the control system 70 modulates conditions to keep the buffer 40 full or substantially full. The control system 70 also includes release logic for determining when to release articles to the operator 52 in the fourth section 50 from the buffer in the third section 40. Preferably, the control system passes articles to an operator at an optimal selected paced rate, generally between about 3,000 and about 5,000 articles per hour, though the paced rate may vary depending on conditions. The paced rate may be set by an operator, and may be changed. The paced rate may be measured based on the distance between the front of a lead article to the front of a trailing package, based on the gap between the trailing end of a package and the front of the next package, or through any suitable means known in the art.

Figure 2:
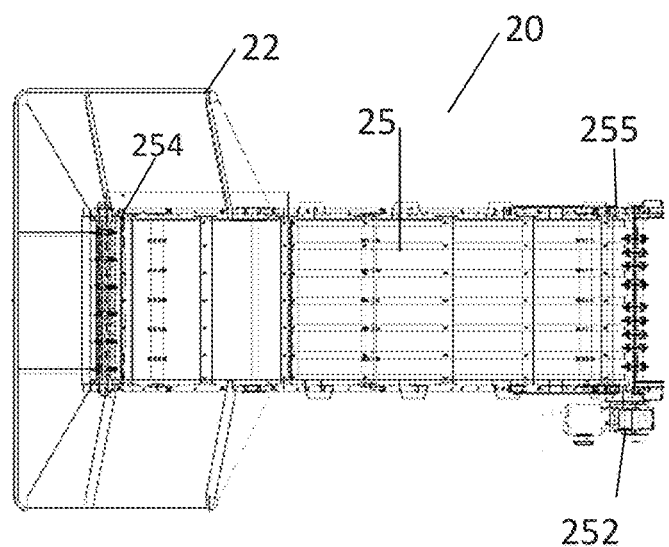
FIG. 2 is a close up view of the first second of the article handling system of FIG. 1.

Referring to FIG. 2, the illustrative first section 20 comprises an unloader (not shown) and an incline conveyor 25 with a hopper 22 for destacking conveyed articles. The open hopper 22 provides easy access for manual unloading of the product into the hopper 22 from which the incline conveyor 25 ascends. The unloader may be a bulk conveyor for conveying articles towards the hopper 22. The unloader preferably interfaces with different styles of pallet and parcel unloading devices. The bulk conveyor may be a modular plastic belt, such as the S400 flat top belt from Intralox LLC, of Harahan, La., or another suitable conveyor driven by a motor in a conventional manner. The bulk conveyor may include side guards. The bulk conveyor may incline, or includes a section that inclines. Alternatively, an operator may dump a container of articles into the hopper to load the incline conveyor.

The first section 20 provides a waterfall transition from the bulk conveyor to the incline conveyor 25 to assist in de-stacking the conveyed articles.

The incline conveyor 25 receives product from the unloader and begins the process of converting a three-dimensional flow of articles to a two-dimensional flow of articles. The incline conveyor 25 also regulates the rate of flow of the articles.

The incline conveyor 25 may be configured to facilitate destacking of articles. In one embodiment, the incline conveyor 25 is a modular plastic belt incline conveyor formed by a pattern of flat top modules, such as the S1400 flat top units available from Intralox, LLC, and friction top modules, such as the series 1400 friction top modular units from Intralox, LLC. The illustrative belt comprises a pattern of fifteen rows of flat top modules followed by three rows of friction top modules interspersed between the flat top modules. The illustrative belt is about 35 inches wide.

The incline conveyor 25 rises along the belt length to assist in destacking stacked articles. In one embodiment, the incline conveyor 25 rises between about 25° and about 35°, to allow product stacked on top of each other to slip off of one another.

A motor 252 drives the incline conveyor 25.

The incline conveyor includes sensors 254, 255, such as Banner retro-reflective photoelectric cells, for monitoring product on the belt 25. The controller 70 controls the motor 252 based on information from the sensors 254, 255 and other sources, such as other sensors in the system 10. The first sensor 254 is located at the tail end of the incline conveyor 25 to detect product placed on the conveyor. Control logic may control the operation of the incline conveyor 25 based on information from the first sensor 254. For example, if no product is detected for a set amount of time, the motor 252 turns the incline conveyor 25 off. When the first sensor 254 is blocked, indicating the presence of product on the incline conveyor 25, the control logic signals the motor 252 to start automatically.

The head sensor 255 monitors product flow. In one application, if the head sensor 255 is blocked by a period longer than a set amount, such as three seconds, indicating an overflow condition, the motor 252 reduces the speed of the incline conveyor 25 by up to 50% to slow down the product flow.

In another embodiment, the operation of the incline conveyor depends on the buffer 40. For example, the controls may signal the motor 252 to operate the incline conveyor 25 when the buffer 40 is not full and-or signal the motor 252 to stop the incline conveyor 25 when the buffer 40 is full.

The induction system 10 may include any suitable device for performing an initial destacking of articles and is not limited to the illustrative incline conveyor 25.

Figure 3:
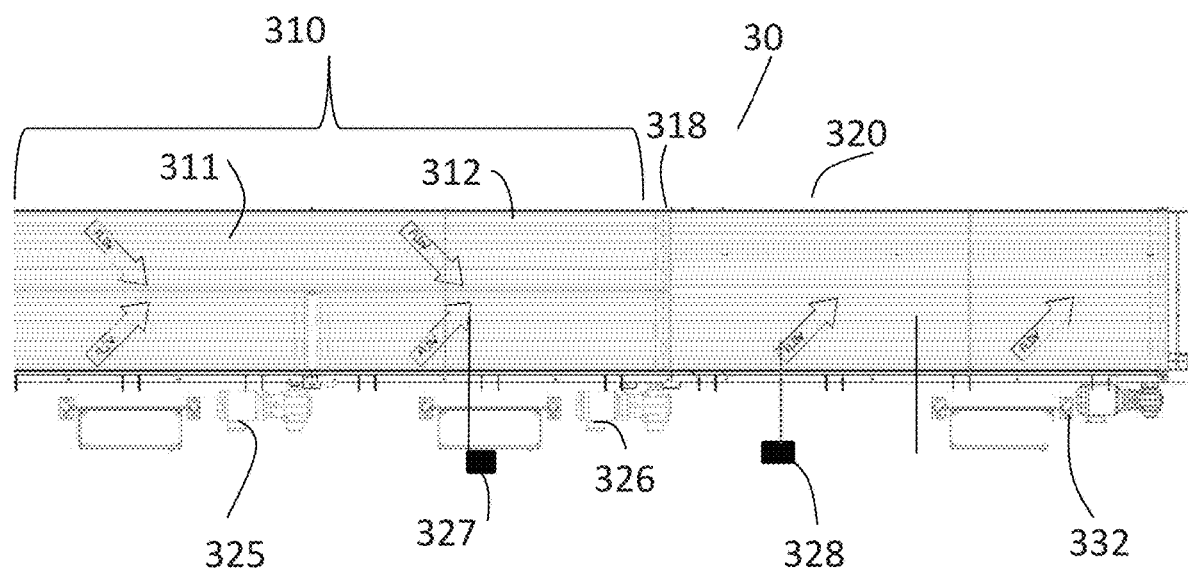
FIG. 3 is a close-up overhead view of an embodiment of the separator of the induction system of FIG. 1.

Product from the incline conveyor 25 passes onto a conveyor in the second section 30. The illustrative induction system 10 has a waterfall transition from the incline conveyor 25 to the third section 30, an embodiment of which is shown in FIG. 3, though the invention is not so limited.

The illustrative separator in the third section 30 comprises a series of conveyors that singulate conveyed articles. In the illustrative embodiment, the separator 30 comprises a number of conveyor belts and operating under control of the control system 70, which regulates the speeds of the conveyor belts. The illustrative separator 30 includes a centering conveyor 310 for receiving articles from the incline conveyor 25 and singulating the articles in a single file line towards the lateral center of the conveyor 310. An aligning conveyor 320 receives the singulated articles and aligns the articles against one side of the separator 30.

The illustrative centering conveyor 310 comprises the ARB™ technology available from Intralox, LLC of Harahan, La. A combination of 30°, 45°, and 60° ARB™ belts can be used to center parcels at different angles. In the embodiment shown in FIG. 3, the centering conveyor 310 comprises has two centering zones formed by a series of conveyor belts 311, 312, having rollers or other devices that push articles towards the lateral center of the centering conveyor. A motor 325 drives the first centering belt 311 and another motor 326 drives the second centering belt 312. Alternatively, the centering conveyor 310 may comprise one or more sets of opposing side-by-side belts.

The centering conveyor 310 includes a flow monitor 327, such as a photoeye.

Figure 4:
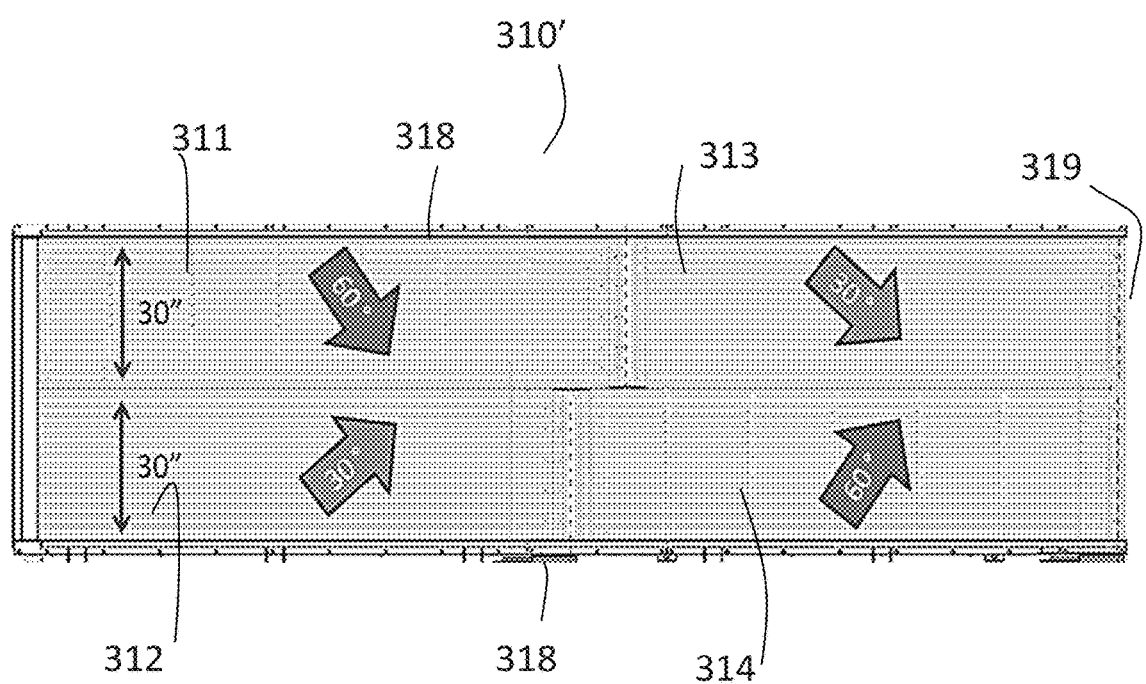
FIG. 4 is an overhead view of an embodiment of the centering conveyor of the separator shown in FIG. 3.

As shown in FIG. 4, one embodiment of a centering conveyor 310' comprises a first centering conveyor having two sets of opposing belts with embedded rollers. The embedded rollers roll during conveyance, causing product to move towards the center of the opposing belts. The centering conveyor 310' comprises a first belt 311' comprising 60° rollers, a second belt 312' opposing the first belt 311' comprising 30° rollers, a third belt 313' in series downstream from the first belt comprising 30° rollers and a fourth belt 314' in series downstream from the second belt comprising 60° rollers. In the illustrative embodiment, the transition between the first belt 311' and the third belt 313' is staggered from the transition between the second belt 312' and fourth belt 314'. The invention is not limited to such an illustrative embodiment, and the centering conveyor may comprise any suitable number, arrangement and type of conveyor.

The illustrative centering conveyor 310' employs Series 400 ARB™ technology by Intralox, LLC. The centering conveyor is driven with sprockets and rides on carry strips. The illustrative conveyor bed comprises activation rollers, which may be steel helix rollers for the 60° modules in belts 311' and 314' and Armor X plating for the 30° modules in belts 312' and 313'. The embedded angled rollers protrude above and below the modules. The activation rollers cause the embedded angled rollers to spin, causing product to move in the direction of the roller orientation (i.e., towards the center of the conveyor).

In one embodiment, the opposing belts 311', 312' and 313', 314' also move at different speeds in addition to the centering action created by the roller angles. The speed differential creates torque on the conveyed items, allowing side-by-side items to separate and form into a single line in the center of the conveyor 310'.

The conveyor may also include side guards 318 to help contain items on the belts.

Motors drive the conveyor belts 311', 312', 313' and 314' under the control of the control system 70.

The centering conveyor 310 or 310' feeds the stream of singulated articles to an aligning conveyor 320, which drives the stream of articles to one side, preferably the operator side. The aligning conveyor 320 has a lower elevation than the discharge end 319 of the centering conveyor 310 to create a waterfall at the transition. The drop helps to de-stack any stacked articles, and reduce jams at the transition.

Figure 5:
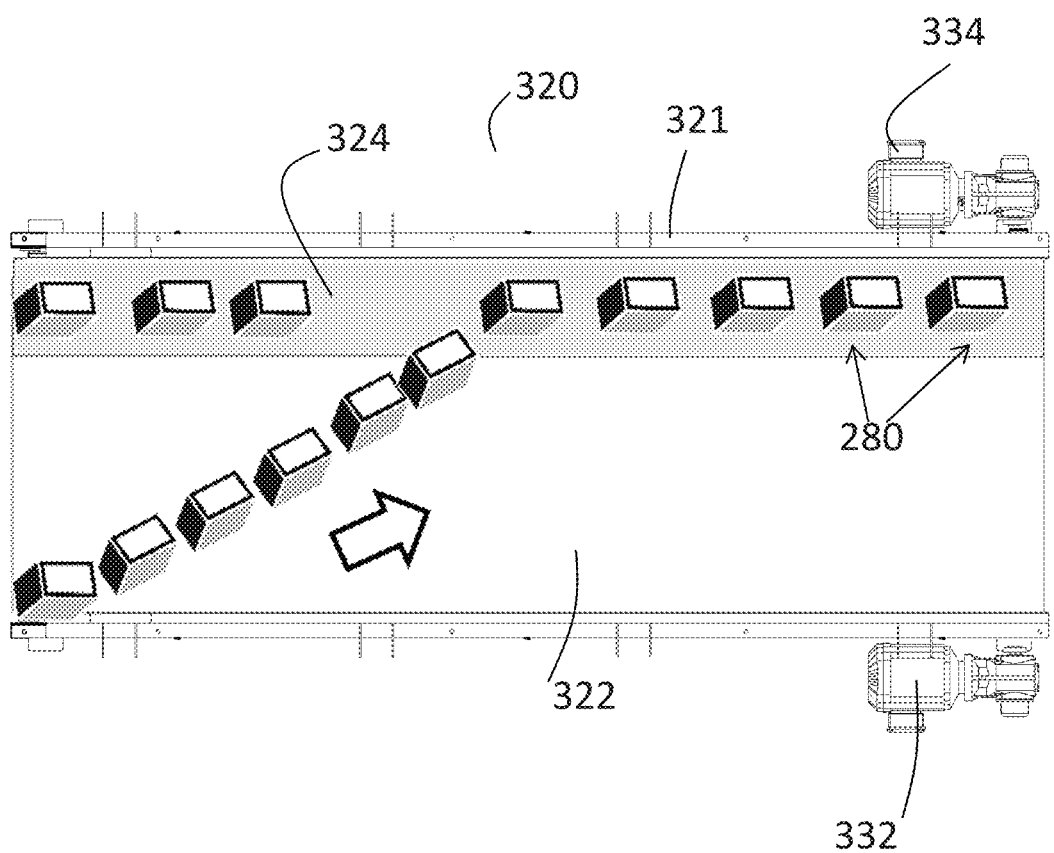
FIG. 5 is a top view of the aligning conveyor of the separator shown in FIG. 3.
Figure 6:
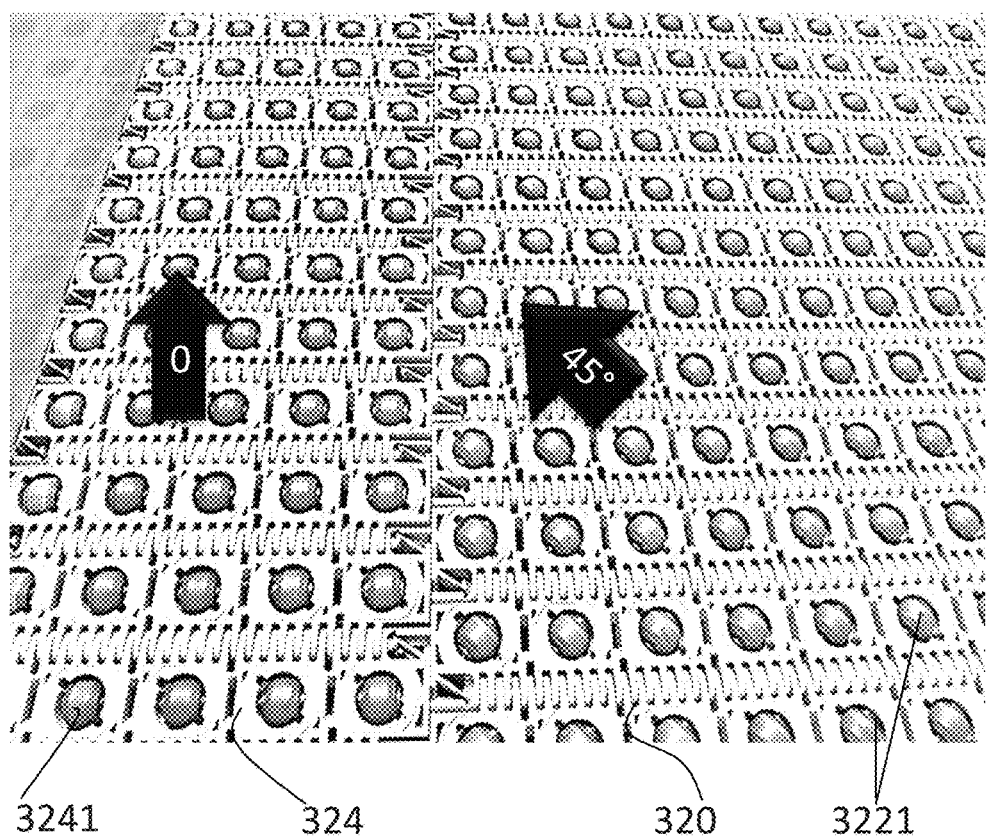
FIG. 6 shows a portion of an aligning conveyor belt in the separator of FIG. 3.
Figure 7:
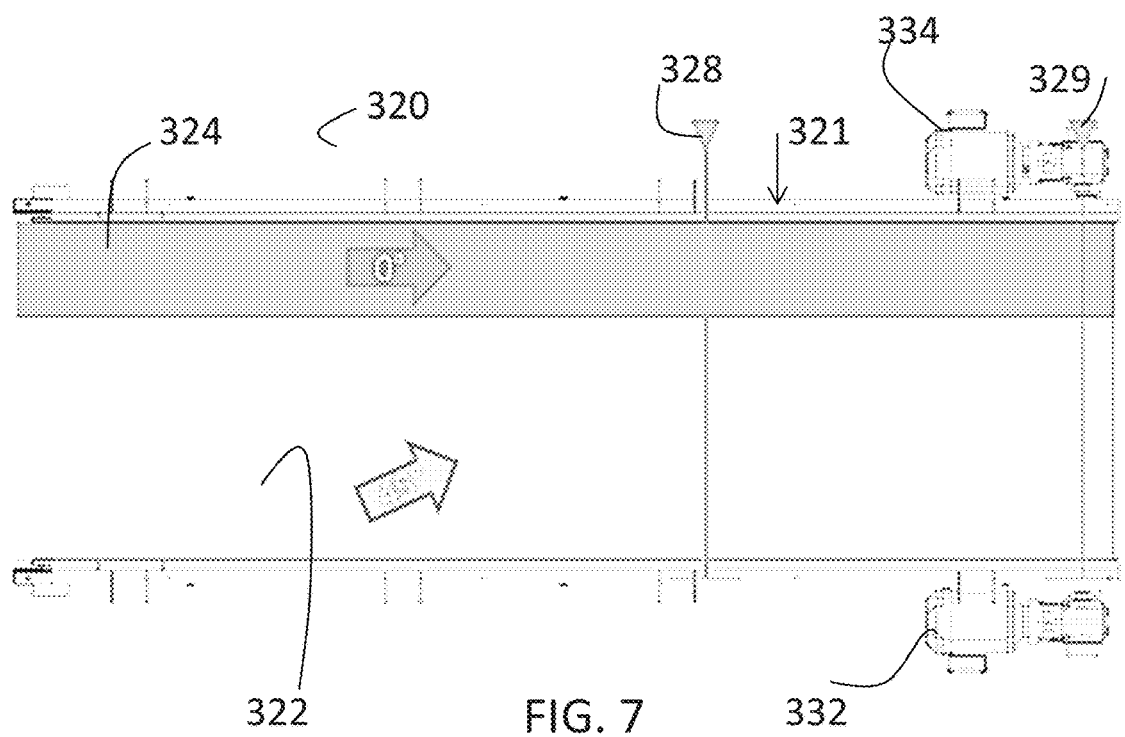
FIG. 7 is another top view of an embodiment of the aligning conveyor in the separation region of FIG. 3.

As shown in FIGS. 5-7, the illustrative aligning conveyor 320 comprises two independently driven belts 322, 324. A narrow belt 324 on the operator side opposes an article-pushing belt 322 for pushing articles towards the narrow belt 324. The narrow belt 324 preferably runs at a faster speed than the article-pushing belt to help pull any connected or clumped articles apart. The illustrative narrow belt 324 comprises a ten-inch wide belt formed of the Series 400 ARB™ 0° modular units available from Intralox, LLC, while the illustrative article-pushing belt comprises a 26-inch wide belt formed of Series 400 ARB™ 45° left hand modular units available from Intralox, LLC. As shown in FIG. 6, the narrow belt 324 includes rollers 3241 oriented at 0° relative to the direction of travel and the pushing belt 322 includes rollers 3221 oriented at 45° relative to the direction of travel for pushing conveyed articles towards the narrow belt 324. Items 280 leaving the aligning conveyor 230 will be justified to a side wall 321 of the conveyor.

The overall speed of the aligning conveyor 320 is faster than the centering conveyor 310. In one embodiment, the speed of the articles doubles between the centering conveyor 310 and the aligning conveyor 320 to provide additional separation of conveyed articles.

As shown in FIG. 7, the aligning conveyor includes two sensors for monitoring the conveyed items. The illustrative embodiment comprises two Banner retro-reflective photoelectric cells 328, 329. The first sensor 328 detects product flow. If the sensor 328 detects a backup, for example, if the sensor is blocked for more than three seconds, the control logic 70 signals the motors 332, 334 to reduce the speed of the aligning conveyor 320 by a selected amount, such as 50% of normal operating speed. The control logic 70 may also instruct the upstream conveyors 25 and 310 to reduce speed based on a blockage signal from the sensor 328. The second sensor 329, located at the discharge end of the aligning conveyor 320, senses the presence of product at the discharge. The control logic 70 uses the signal from the second sensor 329 to initiate operation of the buffer conveyor 40, as described below.

Figure 8:
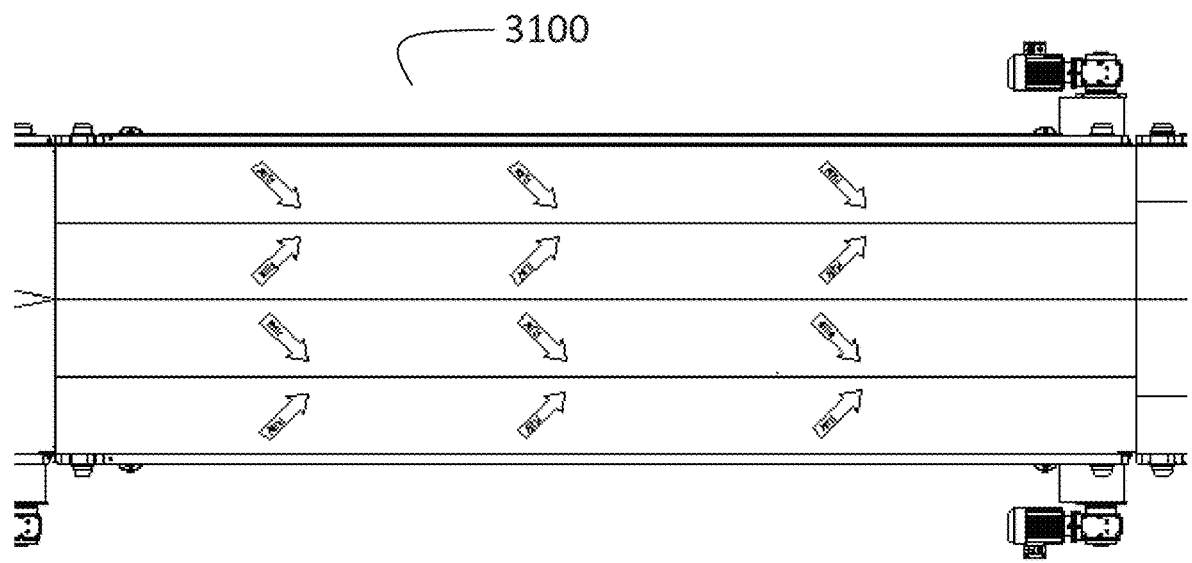
FIG. 8 is an alternate embodiment of a centering conveyor.
Figure 9:
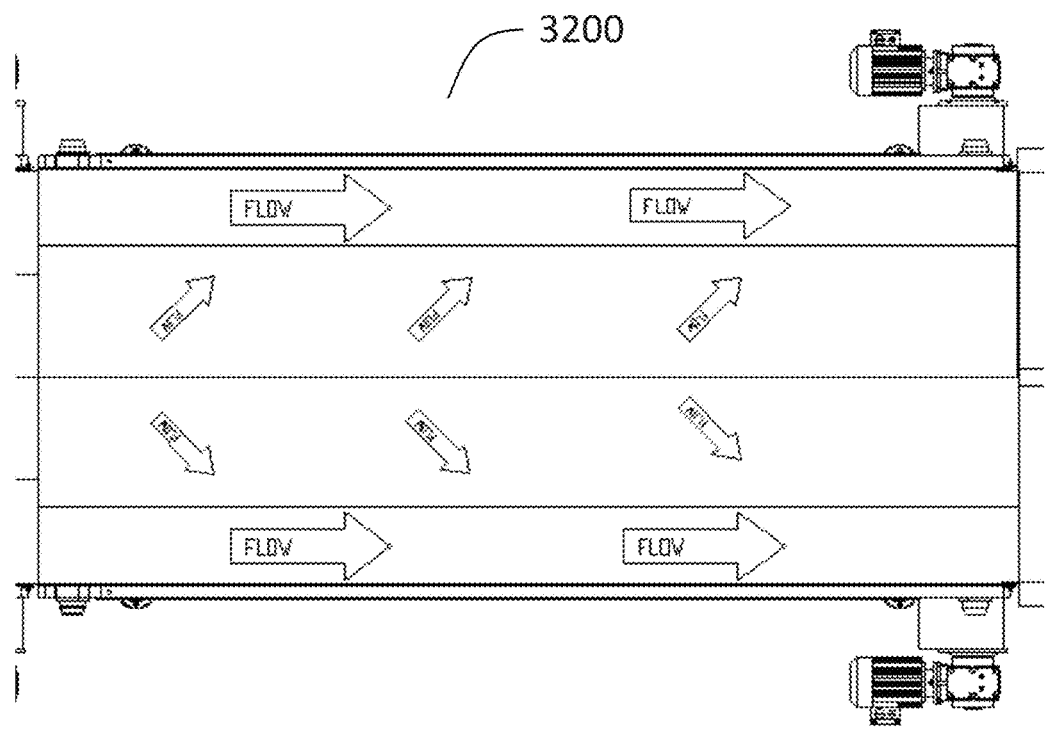
FIG. 9 is an alternate embodiment of an aligning conveyor.

As shown in FIGS. 8 and 9, the separator 30 can alternatively form two streams of articles, each justified against a side of the separator. FIG. 8 illustrates a double centering conveyor 3100 and FIG. 9 illustrates a double aligning conveyor 3200.

Figure 10:
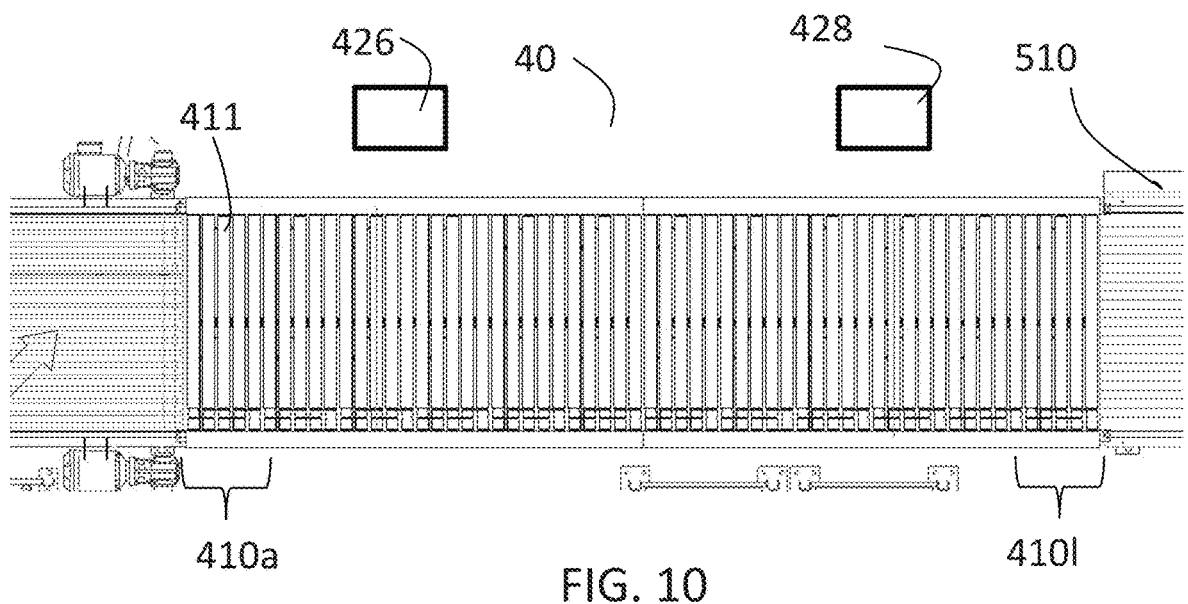
FIG. 10 is an overhead view of the buffer of the article induction system of FIG. 1.
Figure 11:
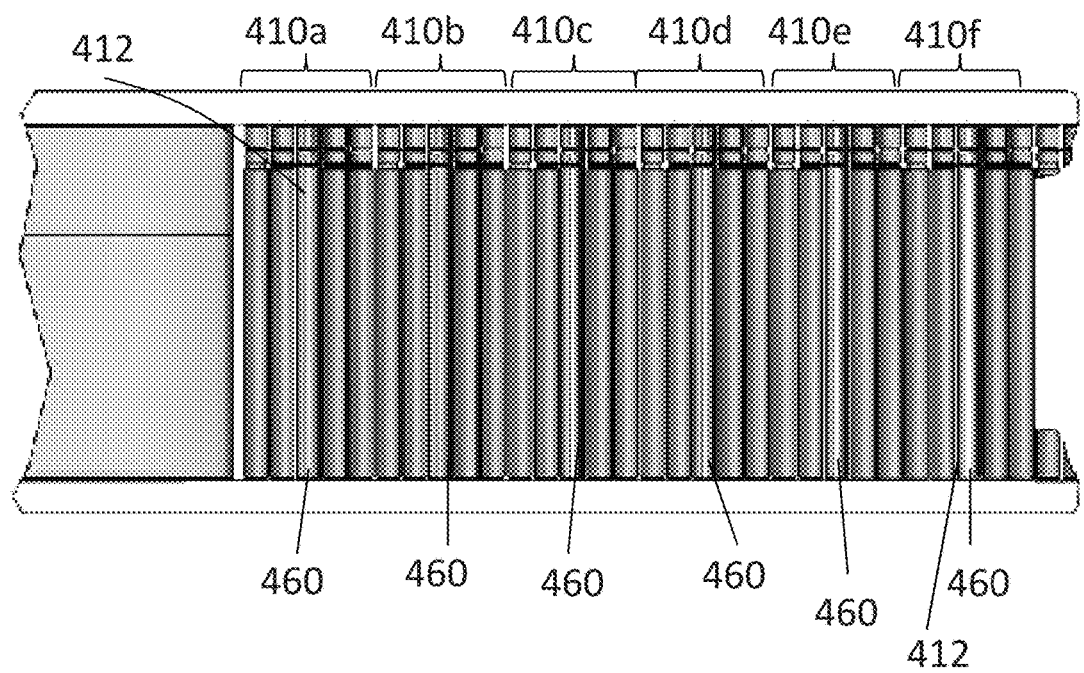
FIG. 11 illustrates a portion of an embodiment of the buffer of the article induction system of FIG. 1.

Referring to FIGS. 1, 10 and 11, downstream from the separator 30, the buffer 40 regulates the flow of articles between the separator 30 and the operator 52. The buffer 40 receives articles from the separator 30 and discharges articles to an operator at the cull belt in section 50 at a suitable paced rate. For example, the separator 30 may have instantaneous speeds of up to about 10,000 parcels per hour, while the operator performs optimally with a steady flow of approximately 4,000 parcels per hour as the paced rate. The buffer 40 regulates the flow to provide an optimal, steady flow rate for the operator. The buffer 40 may also pull apart and declump multiple articles that are clumped together as a single item. The buffer 40 releases articles to the cull belt 50 at a paced rate that is optimal for the operator 52.

The illustrative buffer 40 comprises a motorized drive roller conveyor formed by twelve drive roller zones 410a-410l in series. Each zone comprises five consecutive rollers 411 controlled together. A drive roller 412, illustrated as the third roller in each set, is powered and drives the other rollers in the set.

Sensors in each zone detect product on the buffer 40. The illustrative buffer includes five separate sensors in each zone to detect product. The sensors are in the form of a photoelectric cell bar 460, shown in FIG. 11. Each bar has five separate diffused photoelectric sensors. The blockage of any one of the sensors indicates the presence of product in the corresponding zone. In the illustrative embodiment, the photoelectric cell bar 460 is located between the drive roller 412 (roller #3) and an adjacent roller 411 (roller #4) in each zone.

The buffer 40 allows pauses or slow down of operation by a culling operator 52 without affecting the flow of singulated product from upstream conveyors. The buffer 40 discharges product to the cull belt 510 at a selected paced rate, determined by the control logic 70.

The buffer 40 also includes a "buffer full" sensor 426 and a "buffer empty" sensor 428 for detecting the presence of product on the buffer 40.

The last buffer zone 410l releases articles to the fourth section 50 of the induction conveyor. The release of the articles from the buffer to the fourth section is controlled by the controller 70 based on certain conditions, as described below.

The controller may control the speed of each zone of the buffer to facilitate presentation of the articles to the cull belt 510. For example, one control technique involves setting the first several buffer zones 410a-410e at a high speed to pull the product away from the alignment belt after the alignment belt discharges the product onto the first buffer zone 410a. In one embodiment, the rollers in the first several buffer zones 410a-410e are set to a speed of between about 300 and about 400 feet per minute, and preferably between about 350 and about 370 feet per minute and more preferably at about 360 feet per minute to pass product along. In the next couple of zones 410f and 410g, the speed of the rollers (or other conveyor in the buffer zone) is reduced significantly so that accelerations may be subsequently introduced. In one embodiment, the conveyance speed is halved, to between about 150 and about 200 feet per minute and preferably to between about 175 and about 185 feet per minute and more preferably to about 180 feet per minute for these intermediate zones. In the next two buffer zones 410h and 410i, the conveyance speed is increased. The speed increase facilitates destacking and singulations, especially with flat articles. For example, in one embodiment, the speed is increased to between about 210 feet per minute and about 270 feet per minute, preferably between 230 and about 250 feet per minute and more preferably about 240 feet per minute. The buffer again increases the speed of conveyance in the next two zones 410j and 410k to facilitate further destacking and singulation. For example, the speed may be increased to between about 300 and about 400 feet per minute, and preferably between about 350 and about 370 feet per minute and more preferably to about 360 feet per minute to pass product along to the final buffer zone 410l. In the final buffer zone 410l, product can be brought in at a full rate and released to the cull belt at a reduced rate. For example, the final buffer zone 410l may initially convey at a speed of between about 300 and about 400 feet per minute, and preferably between about 350 and about 370 feet per minute and more preferably at about 360 feet per minute and reduce the speed by half (to between about 150 and about 200 feet per minute) for release to the cull belt.

Figure 12:
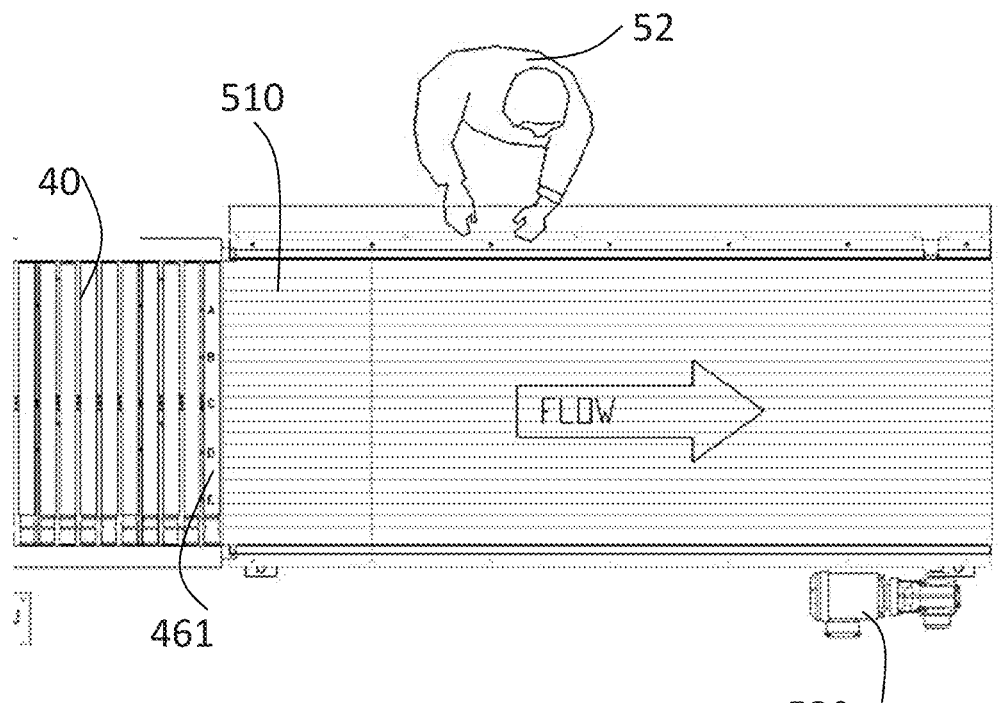
FIG. 12 is an overhead view of the cull belt and discharge end of the buffer of the article induction system of FIG. 1.

The cull belt 510 in the fourth section 50 is the working belt for an operator 52 to remove non-conveyable articles, oversized and-or damaged items. The operator may also manually declump parcels and smooth out labels on soft parcels. The illustrative cull belt, shown in FIG. 12, comprises a single conveyor belt formed of S1000 modules from Intralox, LLC with free spinning rollers to allow low pressure accumulation, though any suitable conveyor technology may be used. A motor 520 drives the cull belt under the control of the controller 70.

Figure 13:
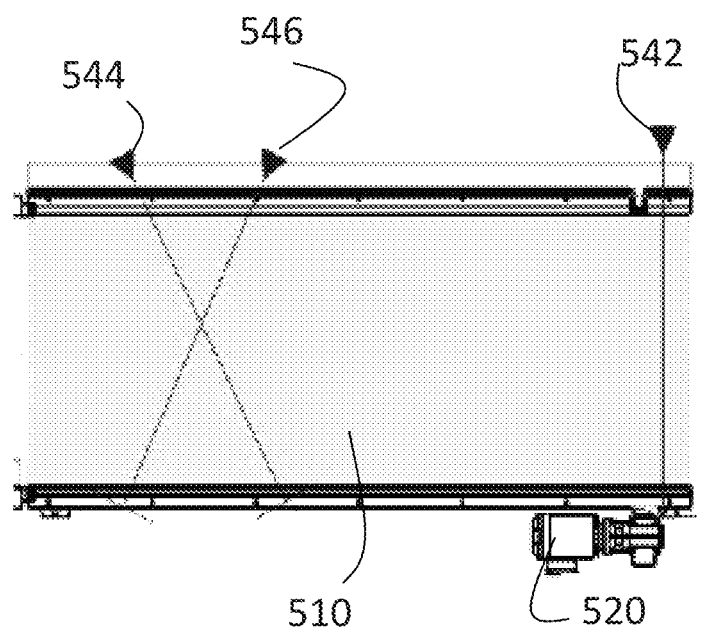
FIG. 13 illustrates the placement of sensors on the cull belt according to one embodiment of the invention.

As shown in FIG. 13, the cull belt 510 includes sensors for monitoring product flow on the cull belt. In the illustrative embodiment, the cull belt includes three sensors to detect backup. A head sensor 542 detects product jam. If the reading from the sensor indicates a jam, the control logic stops the cull belt 510 and upstream conveyors, while continuing to run the downstream conveyors in the subsequent sorting system.

Middle sensors 544, 546 are used to stop product from being discharged from the buffer 40 in the event that multiple products enter the cull belt 510. If the middle sensors 544, 546 are blocked for more than a predetermined amount of time, for example, one second, the control logic signals the buffer conveyor 40 to pause from releasing the next product until the sensor is unblocked for at least a set amount of time.

The interface between the buffer 40 and the cull belt 510 includes an array of sensors 461 for monitoring product. The sensors 461 may be a series of photoeyes extending laterally across the width of the buffer at the transfer end of the buffer 40.

The product induction system 10 employs control techniques to provide optimal performance. The control techniques can be used independently or together.

Figure 14:
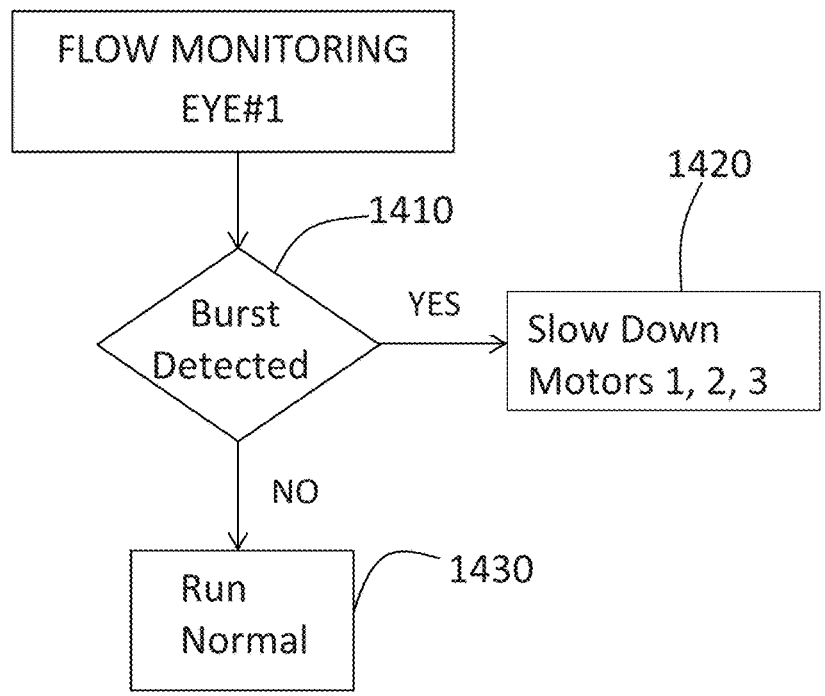
FIG. 14 is a flow chart diagramming a control process for the article induction system of FIG. 1 according to an embodiment of the invention.

A first control technique, diagrammed in FIG. 14, regulates the speed and flow of the articles in the separator 30 to reduce the number of side by side articles. The first control technique controls the motors 252, 325 and 326 based on data from the sensors. In step 1410, the sensor 327 detects a large burst of product, as measured by the amount of time the sensor 327 is blocked. For example, if the sensor 327 is blocked by more than three seconds, indicating that articles are clumped together, the motors 252, 325 and-or 326 slow down in step 1420. If no burst is detected, the motors continue to operate normally in step 1430. The aligner conveyor 320 may continue operating at standard speed.

The slowed down conveyors may return to full speed when the sensor 327 is unblocked for a certain amount of time, such as three seconds. If the sensor is unblocked 327 by a long time, such as ten minutes, one or more of the conveyors may enter sleep mode. The conveyors awake and return to normal speeds when the incline conveyor sensor 255 senses product through a cascade start.

Figure 15:
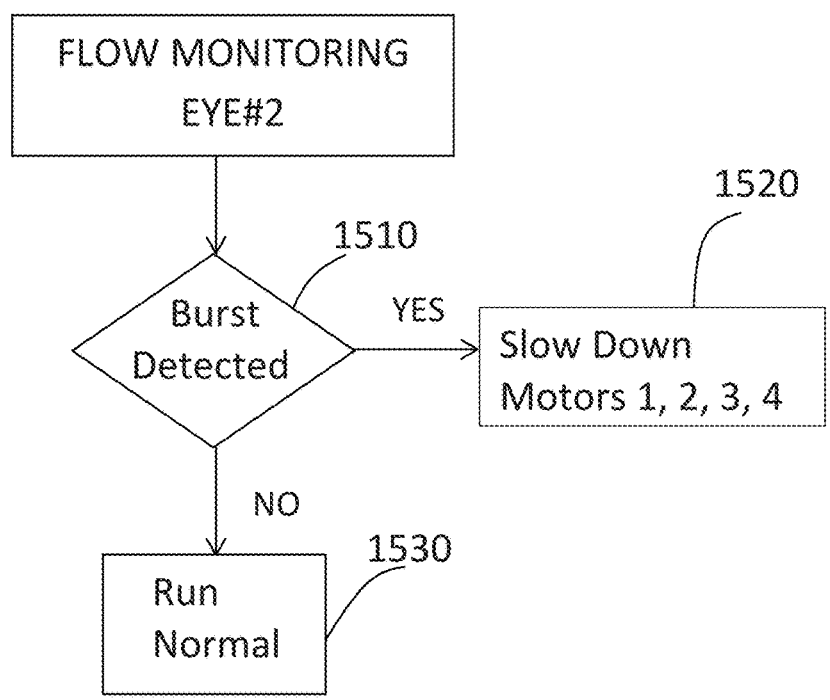
FIG. 15 is a flow chart diagramming a control process for the article induction system of FIG. 1 according to another embodiment of the invention.

FIG. 15 illustrates another control technique using a sensor. If sensor 328 in the aligning conveyor 320 detects a burst of product in step 1510, then the motors 252, 325, 326, 332 and 334 slow down in step 1520. If the sensor does not detect a burst, the motors operate normally in step 1530.

Figure 16:
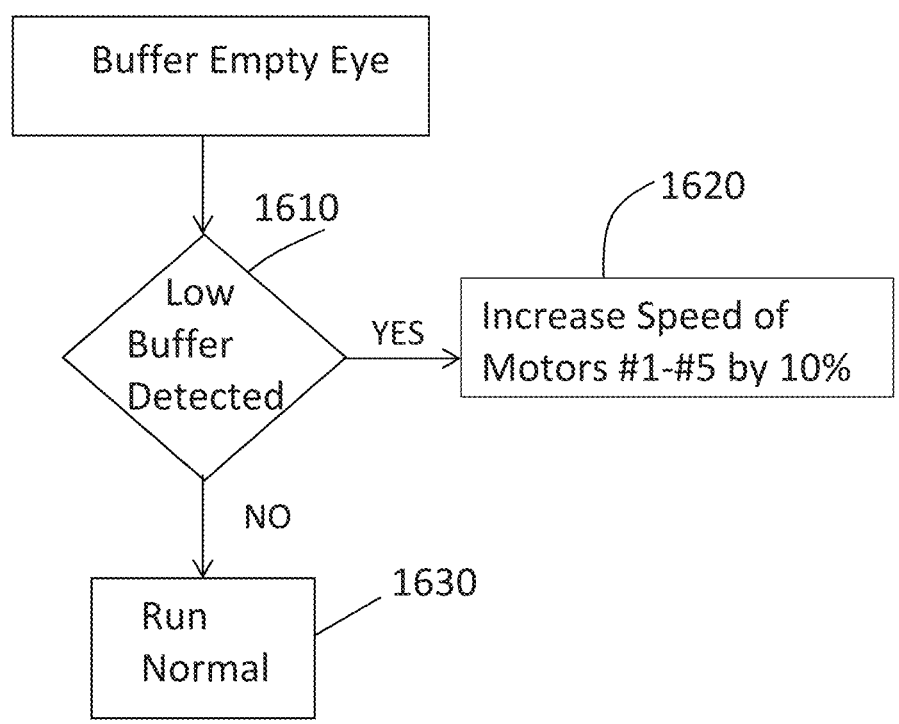
FIG. 16 is a flow chart diagramming a control process for the article induction system of FIG. 1 according to another embodiment of the invention.

The buffer full sensor 426 and buffer empty sensor 428 may be used to regulate the speed of the separator 30 and incline conveyor 25. For example, at a standard operating speed, the inclined conveyor 25 is capable of delivering between 3000 and 4000 parcels per hour, preferably about 3600 parcels. If the empty buffer sensor 438 is clear for more than a specified period of time, such as one second, the incline conveyor 25 speeds up. If the buffer is full, indicated by the full buffer sensor 426, the incline conveyor may slow down or temporarily halt. FIG. 16 illustrates a technique for controlling the induction conveyor based on the buffer empty sensor. The control logic controls the speed of the separator 30 as the buffer 40 fills and empties. For example, in step 1610, the buffer empty sensor 428 senses that the buffer is low if the sensor is unblocked. In response, the control logic increases the speed of motors 252, 325, 326, 332 and-or 334 in step 1620 to fill the buffer 40. If the sensor does not detect a low buffer, the motors run as normal in step 1630.

Figure 17:
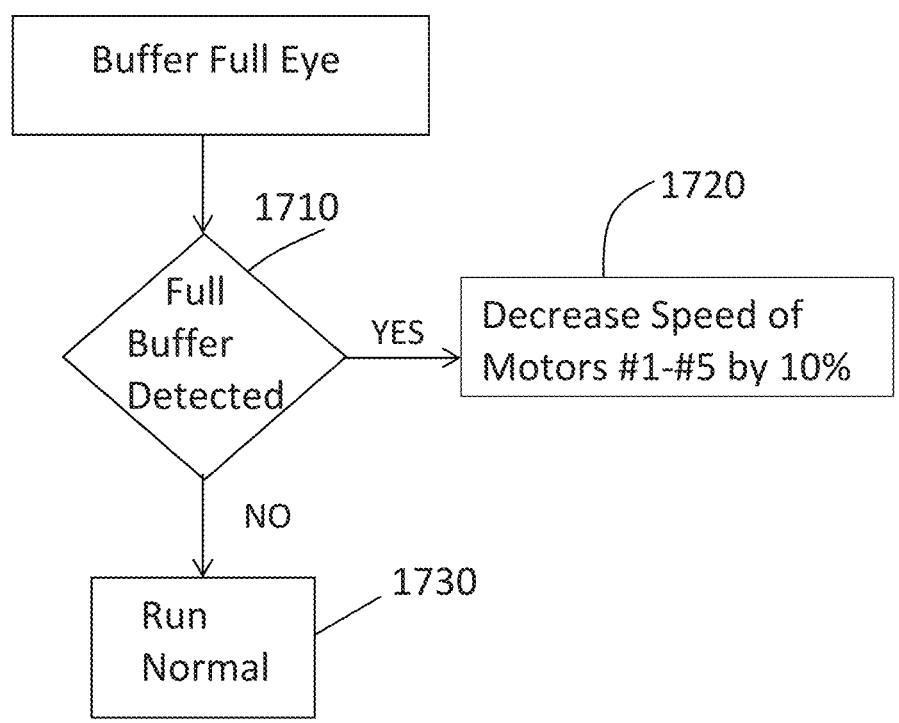
FIG. 17 is a flow chart diagramming a control process for the article induction system of FIG. 1 according to another embodiment of the invention.

FIG. 17 illustrates the steps taken to control the buffer based on a signal from the buffer full sensor 426. If the buffer full sensor 426 is blocked, indicating that the buffer is full or almost full in step 1710, the controls slow down the motors 252, 325, 326, 332 and-or 334 in step 1720 to decrease the number of articles passed onto the buffer 40. If the detection step in step 1710 indicates the absence of blockage, the motors run as normal in step 1730.

Figure 18:
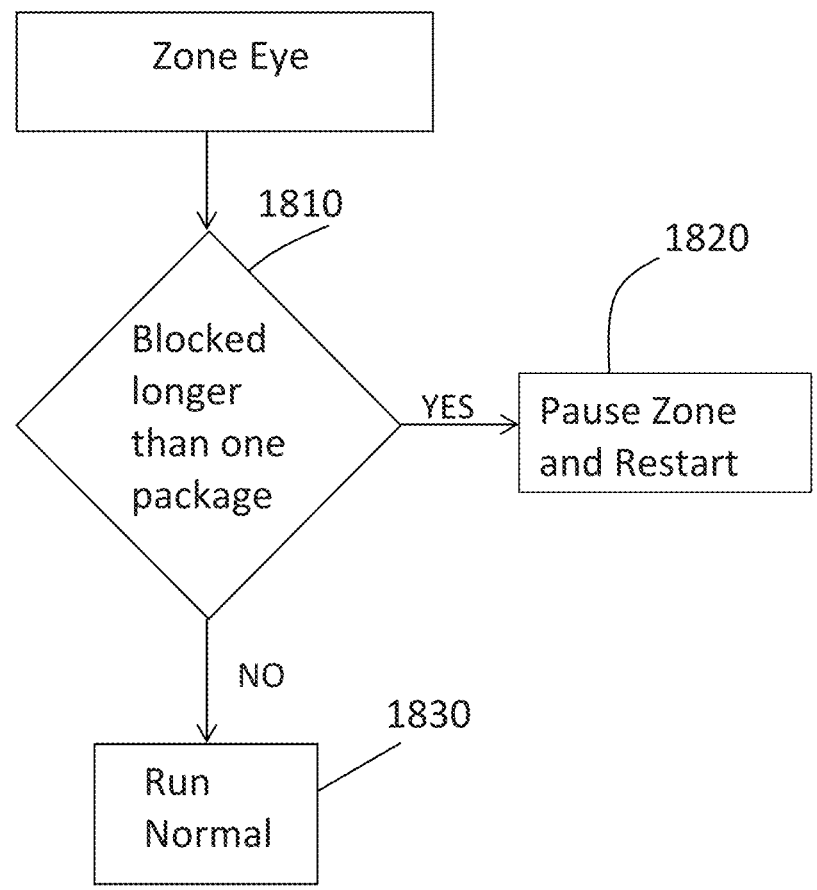
FIG. 18 is a flow chart diagramming a control process for the article induction system of FIG. 1 according to another embodiment of the invention.

FIG. 18 illustrates a control technique used to break up a group of multiple articles flowing as a single item in the buffer 40. If a sensor 460 in a particular buffer zone 410 senses a clump of articles, for example if a photoeye 460 is blocked by longer than necessary for a single article in step 1810, the controls signal the motor for the downstream adjacent buffer zone to pause and restart to declump the articles in step 1820. If the sensor detects no clumping, the motor and buffer zone run as normal.

For example, conveyed parcels in the mail processing industry are normally expected to block a photoeye for a preset amount of time. For example, a 12" box moving 240 feet per minute will block the photoeye for 0.25 seconds. If the photoeye is blocked for longer than 0.25 seconds, there is a high likelihood that two parcels are moving together. Once the photoeye in a buffer zone is blocked for longer than 0.25 seconds, the controls pause the buffer zone below the photoeye. The first box, already advanced to the next zone, should pull apart and create a gap between parcels.

The longest product may be longer than one buffer zone, which requires multiple conveyors working together to move the product.

Figure 19:
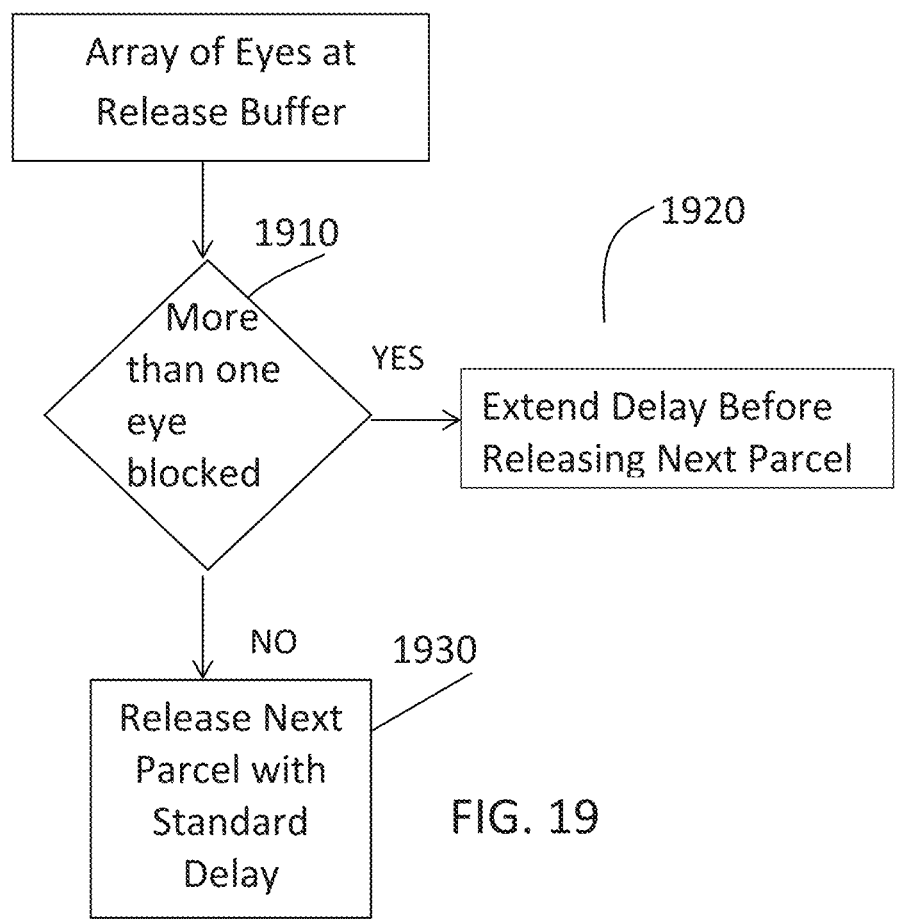
FIG. 19 is a flow chart diagramming a control process for the article induction system of FIG. 1 according to another embodiment of the invention.

FIG. 19 illustrates the steps involved in controlling the release of articles from the buffer 40 to the cull belt 510 for processing by the operator 52. For example, if multiple items are detected and released at the same time, the controller 70 may increase the manual processing time for the operator by delaying the release of an item from the buffer to the cull belt. In step 1910, the array of sensors 461 at the discharge of the buffer is monitored. If more than one sensor in the zone is blocked in step 1920, indicating either multiple items clumped together or a large parcel in the wrong orientation, the controls extend the delay before activating the motor of the last buffer zone to release the next item to the cull belt in step 1920. The delay allows the operator more time to manage the flow of product. If multiple sensors are not blocked, the buffer releases the next parcel onto the cull belt with a standard delay in step 1930.

Figure 20:
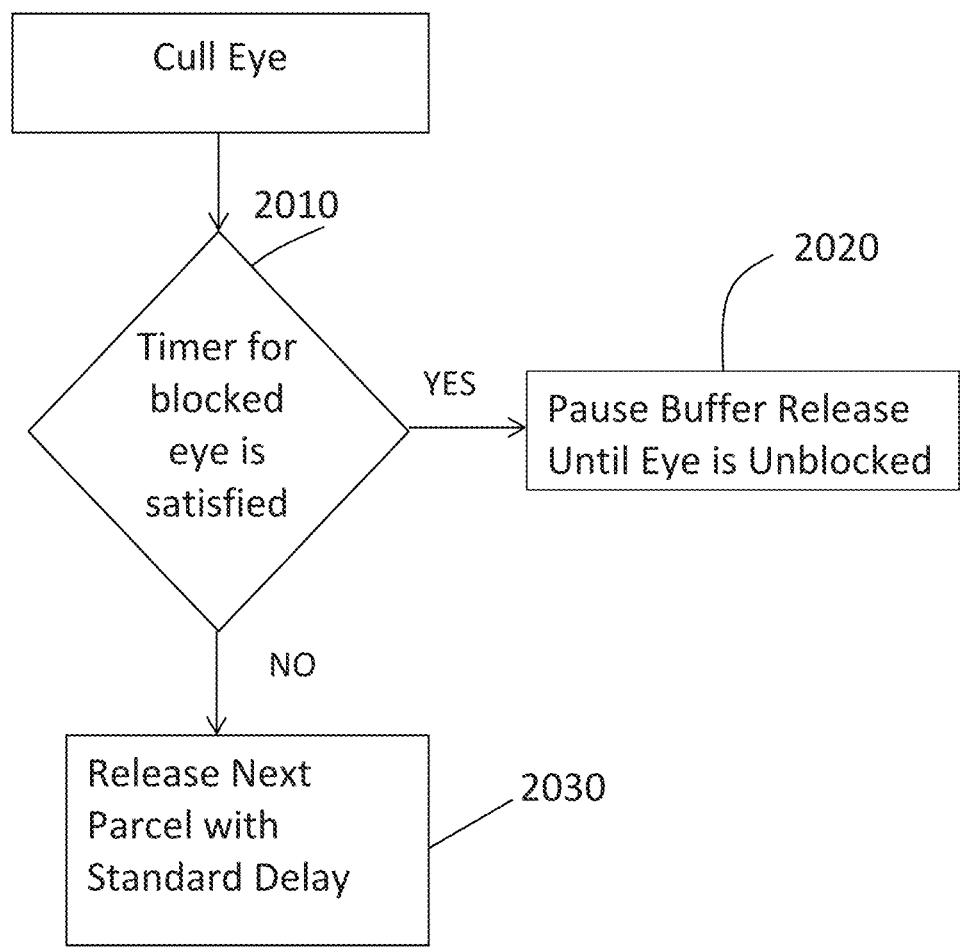
FIG. 20 is a flow chart diagramming a control process for the article induction system of FIG. 1 according to another embodiment of the invention.

FIG. 20 illustrates another method for delaying the release of products onto the cull belt 510 if desired by the operator 52 to provide more time to manage the products on the cull belt. In step 2010, the sensors 461 between the buffer 40 and cull belt 510 are blocked for more than a selected period of time, such as one second. If the sensors 461 are blocked for more than the selected period of time, the buffer release is paused until the sensors are unblocked in step 2020. The sensors 461 may be blocked manually by the operator or by the operator holding back multiple articles so that the articles block the sensors. The pause of the buffer release in step 2020 allows the operator more time to perform the cull function when necessary. If the sensors are not blocked, the buffer 40 releases the next article to the cull belt 510 with the standard delay in step 2030.

Preferably, the buffer passes articles to the operator and the operator processes the articles at the cull belt with a spacing that matches the spacing of carriers in a downstream sorter.

The head sensor on the cull belt may be used to detect a product jam. If the head sensor is blocked by more than a selected amount of time, such as three seconds, the cull belt and all upstream conveyors stop or slow down.

The invention has been described relative to certain illustrative embodiments, though those skilled in the art will recognize that modifications may be made without departing from the scope of the invention.

What is claimed is:

1. An induction conveyor system for preparing a product for processing, comprising:
   a plurality of upstream conveyors for converting a bulk flow of products into a series of products;
   a buffer conveyor for receiving the series of products, buffering the series of products and releasing the product to a cull belt, the buffer conveyor comprising
      a plurality of roller zones, each roller zone comprising a plurality of rollers controlled together and including a powered roller and a zone sensor for sensing product in the roller zone;
   an array of sensors at a discharge of the buffer conveyor for monitoring the product;
   a cull belt for conveying product from the buffer past an operator at a selected paced rate; and
   a controller for modulating conditions in the induction conveyor system to keep the buffer conveyor at least substantially full of product, based on measurements of the product by a plurality of sensors, wherein the controller delays releasing a product at the discharge of the buffer conveyor if more than one sensor in the array of sensors is blocked.

2. The induction conveyor system of claim 1, further comprising a buffer empty sensor for sensing that the buffer conveyor is low of product, wherein the controller increases a speed of an upstream conveyor to fill the buffer conveyor with product.

3. The induction conveyor system of claim 1, further comprising a buffer full sensor for sensing that the buffer conveyor is full of product, wherein the controller decreases a speed of an upstream conveyor to reduce the flow of product to the buffer conveyor.

4. The induction conveyor system of claim 1, wherein the buffer conveyor comprises twelve roller zones in series, each zone comprising five consecutive rollers.

5. The induction conveyor system of claim 1, wherein a first set of roller zones operates at a first speed higher than a speed of an adjacent upstream conveyor to pull the product away from the adjacent upstream conveyor.

6. The induction conveyor system of claim 5, wherein a second set of roller zones operates at a second speed reduced from the first speed.

7. The induction conveyor system of claim 6, wherein a third set of roller zones operates at a third speed increased from the second speed.

8. The induction conveyor system of claim 7, wherein a fourth set of roller zones operates at a fourth speed increased from the third speed.

9. The induction conveyor system of claim 8, wherein a fifth set of roller zones operates at a fifth speed, reduced from the fourth speed and releases the product to the cull belt at the selected paced rate.

10. The induction conveyor system of claim 1, wherein the plurality of upstream conveyors comprises:
 a destacking conveyor for destacking products, the destacker operating at a destacking speed;
 a singulating conveyor receiving product from the destacking conveyor for singulating the product, the singulating conveyor operating at a singulating speed; and
 an aligning conveyor for receiving singulated product from the singulating conveyor and aligning the product, the aligning conveyor operating at an aligning speed.

11. The induction conveyor system of claim 1, wherein the cull belt includes sensors that detect the discharge of multiple products onto the cull belt.

12. The induction conveyor system of claim 11, wherein the controller signals the buffer conveyor to pause from releasing a product until one of the cull belt sensors is unblocked for at least a set amount of time.

13. An induction conveyor system for preparing a product for processing, comprising:
 a plurality of upstream conveyors for converting a bulk flow of products into a series of products;
 a buffer conveyor for receiving the series of products, buffering the series of products and releasing the product to a cull belt, the buffer conveyor comprising
  a plurality of roller zones, each roller zone comprising a plurality of rollers controlled together and including a powered roller and a zone sensor for sensing product in the roller zone;
 an array of sensors at a discharge of the buffer conveyor for monitoring the product;
 a cull belt for conveying product from the buffer past an operator at a selected paced rate; and
 a controller for modulating conditions in the induction conveyor system to keep the buffer conveyor at least substantially full of product, based on measurements of the product by a plurality of sensors, wherein the controller delays releasing a product at the discharge of the buffer conveyor if a sensor in the array of sensors is blocked for more than a selected period of time.

14. An induction conveyor system for preparing a product for processing, comprising:
 a plurality of upstream conveyors for converting a bulk flow of products into a series of products;
 a buffer conveyor for receiving the series of products, buffering the series of products and releasing the product to a cull belt, the buffer conveyor comprising
  a plurality of roller zones, each roller zone comprising a plurality of rollers controlled together and including a powered roller and a zone sensor for sensing product in the roller zone, wherein a first set of roller zones operates at a first speed higher than a speed of an adjacent upstream conveyor to pull the product away from the adjacent upstream conveyor;
 a cull belt for conveying product from the buffer past an operator at a selected paced rate; and
 a controller for modulating conditions in the induction conveyor system to keep the buffer conveyor at least substantially full of product, based on measurements of the product by a plurality of sensors.

15. The induction conveyor system of claim 14, wherein a second set of roller zones operates at a second speed reduced from the first speed.

16. The induction conveyor system of claim 15, wherein a third set of roller zones operates at a third speed increased from the second speed.

17. The induction conveyor system of claim 16, wherein a fourth set of roller zones operates at a fourth speed increased from the third speed and a fifth set of roller zones operates at a fifth speed, reduced from the fourth speed and releases the product to the cull belt at the selected paced rate.

18. An induction conveyor system for preparing a product for processing, comprising:
 a plurality of upstream conveyors for converting a bulk flow of products into a series of products;
 a buffer conveyor for receiving the series of products, buffering the series of products and releasing the product to a cull belt, the buffer conveyor comprising
  a plurality of roller zones, each roller zone comprising a plurality of rollers controlled together and including a powered roller and a zone sensor for sensing product in the roller zone;
 a cull belt for conveying product from the buffer past an operator at a selected paced rate;
 sensors associated with the cull belt for detecting the discharge of multiple products onto the cull belt; and
 a controller for modulating conditions in the induction conveyor system to keep the buffer conveyor at least substantially full of product.

19. The induction conveyor system of claim 18, wherein the controller signals the buffer conveyor to pause from releasing a product until one of the cull belt sensors is unblocked for at least a set amount of time.

* * * * *

UNITED STATES PATENT AND TRADEMARK OFFICE
CERTIFICATE OF CORRECTION

PATENT NO. : 10,500,613 B2
APPLICATION NO. : 16/356048
DATED : December 10, 2019
INVENTOR(S) : Stephen G. Wargo It is certified that error appears in the above-identified patent and that said Letters Patent is hereby corrected as shown below:

On the Title Page

Item (73) Assignee: Laitram, L.L.C. - remove Los Angeles, CA from Laitram information. Should read: Laitram, L.L.C., Harahan, LA (US)

Signed and Sealed this
Twenty-eighth Day of January, 2020

Andrei Iancu
*Director of the United States Patent and Trademark Office*